(12) United States Patent
Mueller-Weinfurtner et al.

(10) Patent No.: US 7,957,492 B2
(45) Date of Patent: Jun. 7, 2011

(54) TFCI DECODING APPARATUS AND METHOD

(75) Inventors: Stefan Mueller-Weinfurtner, Nuremberg (DE); Franz Eder, Burgthann (DE); Frank Heinle, Nuremberg (DE)

(73) Assignee: ST-Ericsson SA, Plan-les-Ouates ( * ) Notice: Subject to any disclaimer, the term of this patent is extended or adjusted under 35 U.S.C. 154(b) by 673 days.

(21) Appl. No.: 11/720,316

(22) PCT Filed: Nov. 24, 2005

(86) PCT No.: PCT/IB2005/053895
§ 371 (c)(1),
(2), (4) Date: Apr. 22, 2008

(87) PCT Pub. No.: WO2006/056957
PCT Pub. Date: Jun. 1, 2006

(65) Prior Publication Data
US 2008/0219384 A1     Sep. 11, 2008

(30) Foreign Application Priority Data

Nov. 25, 2004   (EP) .................................... 04106098

(51) Int. Cl.
*H03D 1/00* (2006.01)

(52) U.S. Cl. .......................... 375/340; 375/347; 375/476

(58) Field of Classification Search .................. 375/340; 370/467, 347
See application file for complete search history.

(56) References Cited

U.S. PATENT DOCUMENTS

| 7,168,015 | B2 | 1/2007 | Ishida |
| 7,272,131 | B2 | 9/2007 | Ohsuge |
| 2002/0145994 | A1 | 10/2002 | Mortensen |
| 2003/0223399 | A1 | 12/2003 | Ohsuge |
| 2004/0123209 | A1 | 6/2004 | Ishida |

FOREIGN PATENT DOCUMENTS

| EP | 1286489 A2 | 2/2003 |
| JP | 2003037583 A | 2/2003 |
| WO | 02/56556 A2 | 7/2002 |

*Primary Examiner* — Shuwang Liu
*Assistant Examiner* — Michael R Neff
(74) *Attorney, Agent, or Firm* — Timothy L. Boller; Seed IP Law Group PLLC (57) ABSTRACT

Wireless communication systems according to 3rd Generation standards allow for large flexibility in payload transmission. To signal the specific combination of transport block sizes multiplexed into one composite transport channel, a transport format combination indicator is transmitted in addition to the encoded payload data. The correct decoding of this transport format combination indicator codeword information is crucial to retrieve the correct number and size of transport blocks from the incoming data stream in the receiver, which can be both, the user equipment or the base station. The decoding apparatus (1) of the invention allows an in-time processing of the incoming data, while the decoding performance for the next codeword information is increased. Therefore, a codeword decision unit (15) determines a first codeword decision on the basis of a first codeword information received. This first codeword decision is usable for the processing of the first payload data. Then, the codeword decision unit (15) decides and outputs a second codeword decision on the basis of the first codeword information and the second codeword information. This second codeword decision has an improved reliability.

25 Claims, 4 Drawing Sheets

TFCI DECODING APPARATUS AND METHOD

The present invention relates to an apparatus and method for decoding a codeword information for a transport format combination indicator. More particularly, the present invention relates to a decoding apparatus and method for decoding a codeword information for a transport format combination indicator for wireless communication systems according to e.g. 3rd Generation standards.

State of the art document EP 1 286 489 A2 describes an apparatus and method for correcting errors in transport format indicators of a Wideband Code-Division Multiple Access (CDMA) communication system. In the method and apparatus known from EP 1 286 489 A2 transport format indicator correction processing is executed with regard to a transport channel of a longest transmission time interval and an erroneous transport format indicator can be corrected among transport formats of a plurality of frames within this longest transmission time interval. Thereby, the transport format indicator is buffered for a plurality of frames within this longest transmission time interval. If a transport format indicator of a specific frame is different from those of the other frames, the value of this transport format indicator is corrected by a majority decision.

The apparatus and method of EP 1 286 489 A2 have the disadvantage that an additional buffer memory is required to buffer the transport format indicator codewords before processing. A further disadvantage is the delay due to this buffering so that the processing of payload data is delayed.

It is an object of the invention to provide an apparatus and method for decoding a codeword information for a transport format combination indicator with an improved decoding performance, especially, with respect to an reduced delay for payload data processing.

This object is solved by a decoding apparatus as defined in claim 1, by a receiver device as defined in claim 13 and by a decoding method as defined in claim 16. Advantageous developments of the invention are mentioned in the dependent claims.

The present invention has the further advantage that a first codeword decision on the basis of a first codeword information can be made and that with this first codeword decision processing of payload data can be carried out at a timing prior to the timing of decoding the last codeword information within the longest transmission time interval. Further codeword information received subsequent to the first codeword information can thus be used for an increased error performance and enable at the same time a timely processing of the payload data.

The measures as defined in claims 2 to 4 have the advantage that the risk of a transport format combination indicator error propagation is reduced. This is especially advantageous, when the first codeword decision was unreliable and/or the maximum transmission time interval of the transmission time intervals is large. The reliability information could be a correlation result or could include correlation results.

The measure as defined in claim 5 has the advantage that a payload processing revision can be provided, which declares erasures for the bits already processed based on an erroneous transport format combination indicator. Hence, a processing of payload data within a short period of time can be achieved.

The measure as defined in claim 6 has the advantage that the decoding performance is further improved. For example, in the Time-Division Duplex standards, the coded composite transport channel occupies several time slots in the sub-frame and an identical transport format combination indicator codeword may be transmitted in every time slot. Hence, several transport format combination indicator codewords are received during a frame. If soft-bits are received for the bit positions within the codeword, the corresponding soft-bits are combined. This feature can be accomplished by a simple addition if the scaling of the received soft-bits is consistent across the time slots. Otherwise, a weighted addition is advantageous to properly reflect the different signal quality of the user codes and time slots. It is to be noted that in Time-Division Duplex with low chip rate it is also possible to do the combining prior to the concatenation to save a small amount of memory for the transport format combination indicator soft-bit storage. This feature of the decoding procedure is herein called intra-frame transport format combination indicator combining.

It is to be noted that Wideband Code-Division Multiple Access does not allow for intra-frame combining, if a large spreading factor is used for the coded composite transport channel, since in this case, only one truncated transport format combination indicator codeword is received per frame, for example, the 10 ms frame. With truncation, it is specified, to drop out two of 32 codeword bits before transmission. For a coded composite transport channel with smaller spreading factor, the transport format combination indicator codeword is transmitted three times in full and one time truncated per frame, for example, per 10 ms frame. Hence, intra-frame combining can also be used in Wideband Code-Division Multiple Access, but in slightly modified fashion, when compared to the Time-Division Duplex standards. Here, a large spreading factor in Wideband Code-Division Multiple Access means a spreading factor greater or equal 128 (truncated transport format combination indicator) and a small spreading factor means a spreading factor less than 128, that is the repeated transport format combination indicator, so that combining is possible.

The measure as defined in claim 7 has the advantage that an improved decoding performance is provided. For example, in additive white Gaussian noise channels, improvements of 3 dB are achieved for duplicated transport format combination indicators, while gains in fading channels are much larger due to the increased time diversity. In case that non of the transport channels in the coded composite transport channel has the minimum possible transmission time interval, for example, of 10 ms, the transport format combination indicator codewords received during several frames, i.e., during the minimum transmission time interval of the time intervals, are identical and can be combined. Herein this procedure is called inter-frame transport format combination indicator combining. As an advantageous development of the present invention, the payload frame decoding processing can start with the premature transport format combination indicator decision obtained from the first intra-frame combined codeword. It then is a desirable option to do at least a further decoding with the much more reliable inter-frame-combined codeword for transport format combination indicator error checking purposes. Possibly, a different transport format combination indicator decision is obtained in the further decoding, which must be used to adapt data buffer sizes in order not to crash the modem firmware. Optionally, it can be used to correct the already initiated payload data processing by rearranging the soft-bits or by erasing the wrongly process soft-bits of the previous frame to zero. Especially for transport channels with transport time intervals spanning four frames or eight frames having, for example, 40 ms or 80 ms, respectively, an erasure of the entire first frame due to a transport format combination indicator error is often tolerable. Hence, a partial error recovery for wrong initial transport format combination indicator decisions becomes possible by doing inter-frame transport format combination indicator combining and decision revision.

It is to be noted that the codeword information combining for inter-frame transport format combination indicator combining can be carried out, same as in intra-frame combining, by a simple addition or a weighted addition according to the power of the received signal to correct for inconsistent scaling of soft-bits spread across frames.

The measures as defined in claims 10 to 13 have the advantage that a masked maximum search can be performed, which takes into account the indicator list of available transport format combinations as input. For an enhanced performance, a correlation metric is computed for each transport format combination indicator codeword hypothesis. If the codeword is of length 32 or length 16, these correlation results can be obtained in parallel by means of a Walsh-Hadamard Transform of respective size. For a smaller codeword length, the respective correlation result can be obtained by doing several explicit correlations with the few codeword hypotheses in the code. Instead of doing a straight-forward decoding by simply deciding in favor of the maximum of all these correlation results, an advantageous development of the present invention is to take into account a codeword list comprising a list of allowable codewords. This input list is sometimes scarcely populated and is, in some applications, made available by higher layers, for example protocol software layers, to the transport format combination indicator decoder apparatus, such that this one can take advantage of this side information in order to produce only such decisions being acceptable by higher layers. Instead of having a single transport format combination indicator decision, an ordered output list of, for example three, transport format combination indicator candidates together with the achieved correlation is stored in the codeword list, and the highest ranking will be the obvious working assumption for the current frame. Under the condition that the transport format combination indicator decision is wrong, the probability to find the correct transport format combination indicator among the next few candidates is quite high. The codeword list and the matrix are stored in order to verify or revise the premature decision in the or a following frame.

The measures as defined in claims 10 to 13 have also the advantage that the performance of the transport format combination indicator decoding can be further enhanced. Within a coded composite transport channel the transmission time intervals for different transmission channels can be different, but, in generally, the transmission time interval boundaries are frame aligned. The shortest and longest transmission time interval duration is called herein minimum transmission time interval and maximum transmission time interval, respectively. During such a minimum transmission time interval several frames can be received, if, for example, the minimum transmission time interval is greater than 10 ms, and the transmitted transport format combination indicator will be the same in all those frames. If one or some transmission frame combinations are not configured by the transmitter, for example due to network properties, so that the corresponding transmission frame combination indicator codeword is not transmitted, this transport frame combinations are not included in the list of available codewords. Because the list of allowable codewords is derived from the list of available codewords, transport frame combinations not included in the list of available codewords are also not included in the list of allowable codewords. If a new transmission time interval begins for each of the transmission channels, the transport format is unknown for each of these channels. Hence, a transport format combination indicator decision is made in view of the list of available codewords. The performance of a subsequent transport format combination indicator decoding can be improved, because the list of allowable codewords is reduced on the basis of the previous codeword information. Thereby, it is possible to erase all transport format combination entries from the list of allowable codewords, which would violate the continuity of the transport formats in the respective transmission channels. In case that the boundary of at least one transmission time interval of a transport channel is reached, the list of allowable codewords can also be extended.

Especially, in case that the maximum transmission time interval is large, a confirmation of a transport format combination indicator decision based on a third codeword information as defined in claims 2 to 4 is advantageous.

These and other aspects of the invention will be apparent from and elucidated with reference to the embodiment described hereinafter.

The present invention will become readily understood from the following description of preferred embodiments thereof made with reference to the accompanying drawings, in which like parts are designated by like reference signs and in which.

Figure 1:
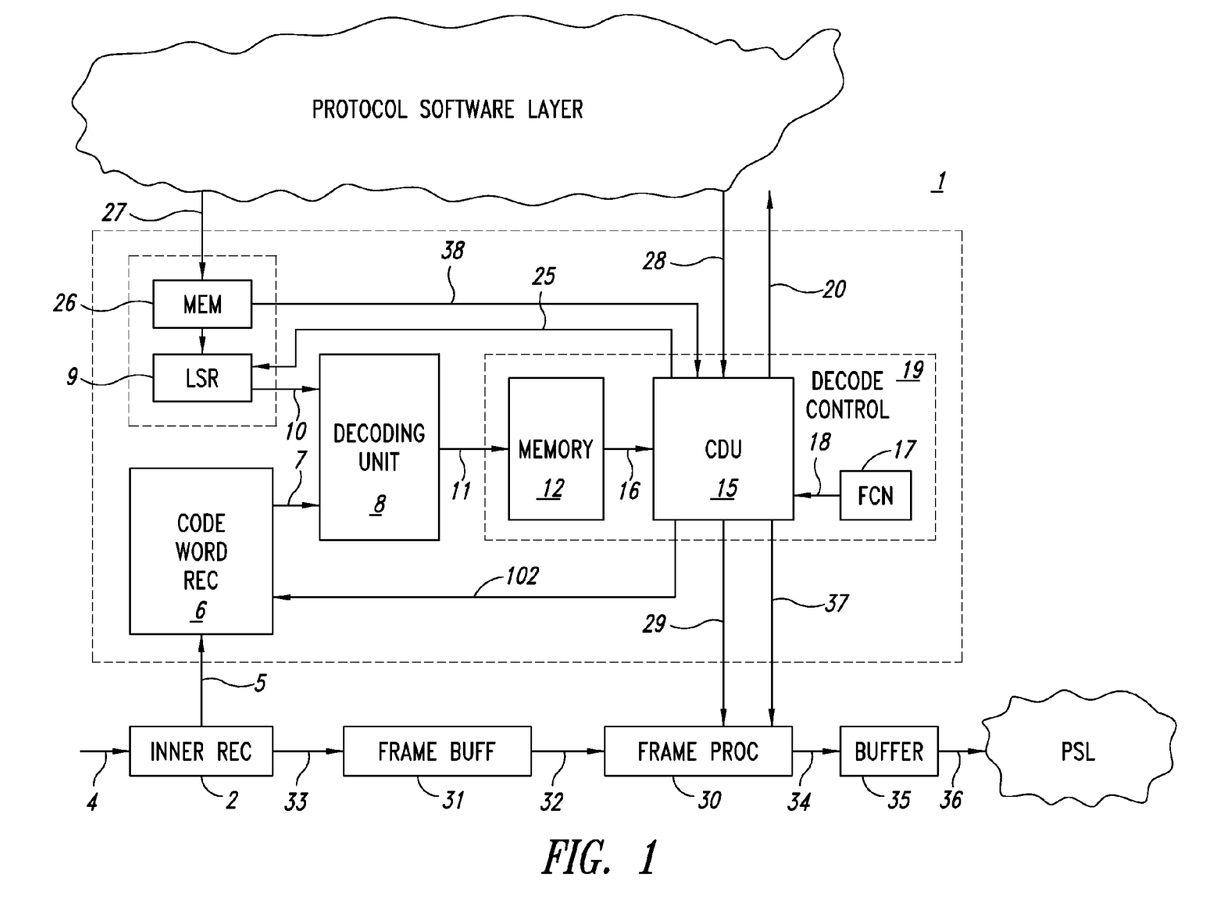
FIG. 1 shows a decoding apparatus according to a preferred embodiment of the present invention.

FIG. 1 shows a schematic structure of a decoding apparatus 1 according to the preferred embodiment of the invention. The decoding apparatus 1 can be used for wireless communications systems according to 3rd Generation standards. The decoding apparatus 1 and the decoding method described below are applicable but not limited to Wideband Code-Division Multiple Access and Time-Division Duplexing high/low chip rate within the UMTS standards family. The decoding apparatus 1 and the decoding method are, in generally, applicable for wireless communication systems, which make use of a composite transport channel. To signal the specific combination of transport block sizes multiplexed into one composite transport channel, a codeword information for a transport format combination indicator is transmitted in addition to the encoded payload data. For example, up to 10 information-bearing transport format combination indicator bits are transmitted by means of one transport format combination indicator codeword of specified length to signal the transport format combination during a signal portion of, for example, 10 ms, which is called a frame. The correct decoding of this transport format combination indicator codeword information is crucial to retrieve the correct number and size of transport blocks from the incoming data stream in the receiver device, which can be both, the user equipment or the base station. But, the decoding apparatus 1 and the decoding method can also be included in or precessed by other equipments.

The decoding apparatus 1 according to the preferred embodiment comprises a receiving unit. The receiving unit comprises an inner receiver 2 for receiving data from a base station 3 (FIG. 4) over a line 4, and a codeword receiving unit 6. The received data can comprise codeword information for a transport format combination indicator, payload data and further control data. The codeword information can be the transport format combination indicator codeword as such or an information comprising this transport format combination indicator codeword. The codeword information for the transport format combination indicator is separated from the other data in the inner receiver 2 and sent over a line 5 to the codeword receiving unit 6. The codeword receiving unit 6 is adapted to receive a first codeword information, a second codeword information, and further codeword information, which follow each other. The codeword receiving unit 6 outputs a codeword information over a line 7 to a decoding unit 8. Before the codeword receiving unit 6 outputs the codeword information to the decoding unit 8, a intra-frame combining, a inter-frame combining and/or a codeword weighting can be performed, as described below in detail with reference to FIG. 2.

It is preferred, that one codeword information input to the decoding unit 8 follows another codeword information. But, it is also possible, that two or more of such codeword information parts are sent over the line 7 in parallel to the decoding unit 8.

Decoding unit 8 performs a transport format combination indicator codeword decoding on the basis of the codeword information input from line 7. Thereby, a output list for possible transport format combination indicator candidates with assigned correlation results is generated. The correlation results are a quantity for ranking the possible transport format combination indicators according to their probability. The list generated by the decoding unit 8 is also based on a list of allowed codewords received from a list reduction unit 9 over a line 10, as described in further detail below.

The decoding unit 8 outputs the list comprising possible transport format combination indicator codewords with their correlation result over a line 11 to a memory unit 12. The memory unit 12 is adapted for storing the transport format combination indicator list and assigned matrix information. To simplify the overall processing, the decoding unit 8 can only output a list to the memory unit 12, with, for example, the three or four best candidates.

The decoding apparatus 1 comprises a codeword decision unit 15. The codeword decision unit 15 is adapted to decide and output a codeword decision on the basis of the list stored in the memory unit 12. Therefore, the list stored in the memory unit 12 is read out by the codeword decision unit 15 over a line 16. A frame counter 17 counts the frames input over the line 4 and outputs a value over a line 18 to the codeword decision unit 15, which value is determined by the results of calculating the frame count modulo 8. Hence, the value input to the codeword decision unit 15 over the line 18 is a value between 0 and 7. Of course, depending on the application, an other integer than 8 can be used in this calculation. The memory unit 12, the codeword decision unit 15 and the frame counter 17 are parts of a transport format combination indicator decoding control 19.

The codeword decision unit 15 outputs a codeword decision, that is a final transport format combination indicator decision, over a signaling line 20. The line 20 is also the output of the decoding apparatus 1.

Further, the codeword decision unit 15 can output the codeword decision over a line 25 to the list reduction unit 9. Based, for example, on the control data received from the base station over the input line 4 an information about available codewords is input to a memory unit 26 over a line 27. Hence, the memory unit 26 stores the list of available codewords which can be time variant, but can be regarded as time invariant for the purpose of the description of the preferred embodiment of the invention. The list of available codewords stored in the memory unit 26 is a starting point for the decoding unit 8, because only transport format combination indicator codewords included in the list of available codewords are open for a codeword decision.

Although, an information about the actual state of the coded composite transport channel is received by the codeword decision unit 15 over a line 28.

If the codeword decision unit 15 makes a codeword decision and regards this decision as reliable, it outputs the codeword decision over the line 25 to the list reduction unit 9. Based on the codeword decision from the codeword decision unit 15 the list reduction unit 9 can reduce the list of allowable codewords for the next codeword decision. Thereby, the codeword decision unit 15 can decide a codeword decision as reliable, if the correlation result for this codeword exceeds a certain limit or if the distance of the best candidate from the list of possible codewords stored in the memory unit 12 to the other possible codewords stored in the memory unit 12 exceeds a certain value or percentage. A further description of the transport format combination indicator list reduction is made below with reference to FIG. 3.

As an example, the three best results of the list stored in the memory unit 12 of FIG. 1 can comprise the following pairs of an abstract number for the transport format combination indicator codeword and the correlation results: (7, 27.4), (2, 26.8), (17, 19.3). This list provides a list of the three possible candidates. The transport format combination indicator decision in the strict sense is the candidate list leader. The candidate list can be used to resolve conflicts in case that a second transport format combination indicator decoding decision contradicts a previous decision. In this example, the correlation matrix for the transport format combination indicator No. 2 is quite close to the decision with transport format combination indicator No. 7, so that there is a significant probability for the decision to be in error. In this case the codeword decision unit 15 outputs a codeword decision over a line 20, but refrains from sending this decision to the list reduction unit 9, if the value from the frame counter 17 is low, especially 0. The next codeword information received by the receiving unit 6 is used to confirm the foregoing codeword decision. If the further codeword decision confirms the foregoing decision, the codeword decision unit 15 outputs the codeword decision to the list reduction unit as an approved codeword decision. Also, a codeword decision is output to line 20. In case that the further codeword decision does not confirm the foregoing codeword decision, the codeword decision unit 15 outputs a codeword decision on the basis of both the actual codeword information and the foregoing codeword information as a common codeword decision. And, in this case, the codeword decision unit 15 declares a payload processing revision signal over a line 29 to a frame rate processing unit 30 of an outer receiver. Especially, the codeword decision unit 15 declares an erasure for the payload data already processed on the basis of the previous codeword decision based on the erroneous codeword information. Thereby, the processing unit 30 receives frames that follow each other from a frame buffer 31 over a line 32. The frame buffer 31 is adapted for intermediate storage of payload data, control data and such of at least one frame. Thereby, the frame buffer 31 receives the frames over a line 33 from the inner receiver 2. A frame processed by the processing unit 30 is sent over a line 34 to a transmission time interval buffer 35 for intermediate storage of at least one frame. The transmission time interval buffer 35 outputs the data over a line 36, whereby the control data is sent to a protocol software layer and the payload data is sent to a user interface. The protocol software layer can provide an information about available transport format combinations and an information about the decoded composite transport channel and send them over lines 27 and 28 to the memory unit 26 and the codeword decision unit 15, respectively.

The codeword decision unit 15 can also make a tentative transport format combination indicator decision, and can send this decision over a line 37 to the processing unit 30. The list of available codewords is read out from the memory unit 26 by the codeword decision unit 15 over a line 38. Such a read out can be repeated periodically and/or due to a control signal from the protocol software layer indicating that the list of available codewords has been changed.

As illustrated, FIG. 1 shows a line 102 coupling the codeword decision unit 15 to the codeword receiving unit 6.

Figure 2:
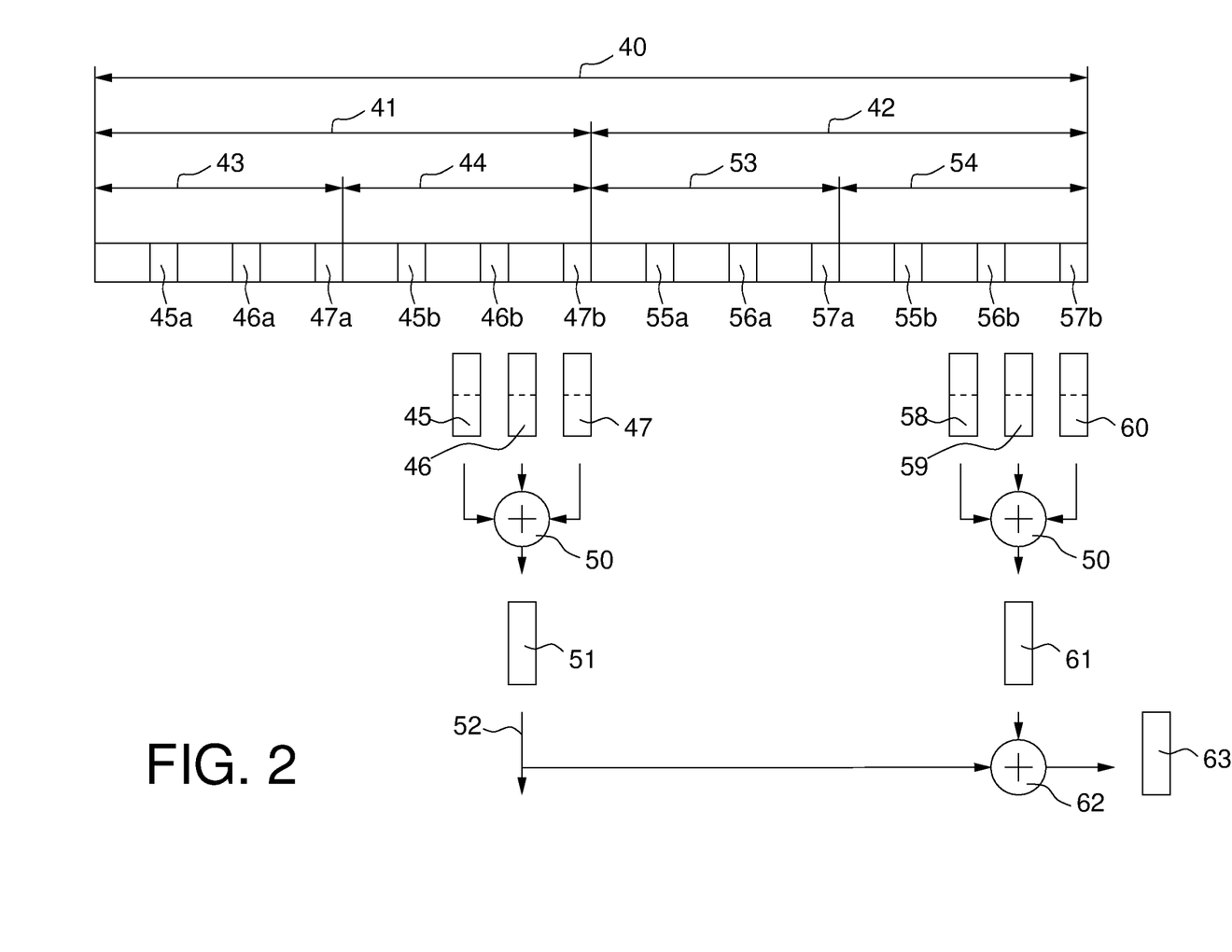
FIG. 2 illustrates a combining process of the decoding method according to the preferred embodiment of the present invention.

FIG. 2 illustrates a decoding method for decoding a codeword information according to the preferred embodiment of the invention. Thereby, FIG. 2 shows the aspect of combining codeword information for a transport format combination indicator. In FIG. 2 the minimum transmission time interval 40 is 20 ms long, so that within the minimum transmission time interval 40 a frame 41 with 10 ms and a further frame 42 with 10 ms are transmitted. The 10 ms frame 41 is subdivided into a 5 ms sub-frame 43 and a 5 ms sub-frame 44. Thereby, the sub-frame 43 carries the first half 45a of the transport format combination indicator codeword information 45, while the sub-frame 44 contains the second half 45b of the transport format combination indicator codeword information 45, so that at least one full transport format combination indicator codeword information 45 is obtained in the 10 ms frame 41. The first half 45a and the second half 45b of the codeword information are combined by concatenation to the codeword information 45. In the embodiment shown in FIG. 2 the coded composite transport channel occupies several time slots in the sub-frame 41 so that the first half 45a of the codeword information 45 is received several times, as indicated by the reference signs 46a and 47a. The second half 45b, 46b and 47b of the codeword information 45, 46 and 47 is also received several times. The first half 46a, 47a and the second half 46b and 47b are combined to the codeword information 46 and 47, respectively. Hence, in the shown example three codewords 45, 46 and 47 are received.

It is to be noted, that in Time-Division Duplex with low chip rate the above mentioned division in sub-frames 43 and 44 is made, but that in Time-Division Duplex with high chip rate and Wideband Code-Division Multiple Access the subdivision of the 10 ms frame 41 does not exist and the full transport format combination indicator codewords 45, 46 and 47 are immediately received.

The codeword information 45, the codeword information 46 and the codeword information 47 are combined by addition in a combining unit 50 of the receiving unit 6 (FIG. 1). The combining can be performed in various ways, for example, by a normal or weighted addition. The weighted addition is in best mode according to the power of the received signal to correct for inconsistent scaling of soft-bits 45a, 46a, 47a, 45b, 46b, 47b spread across frames. If the scaling is consistent, that means identical gain settings in the receiver chain, it is a simple non-weighted addition. The results of the combining is a combined codeword information 51. The combined codeword information 51 is output to the decoding unit 8 (FIG. 1) as shown by an arrow 52.

The frame 42 comprises a sub-frame 53 and a sub-frame 54. Further, soft-bits 55a, 56a, 57a, 55b, 56b and 57b are included in the sub-frame 53 and sub-frame 54, respectively. The arrangement of the frame 42 is the same as that of frame 41. Hence, to avoid repetitions, reference is made to the above description, accordingly.

The soft-bits 55a, 56a, 57a, 55b, 56b and 57b are combined to the codeword information 58, the codeword information 59 and the codeword information 60. The codeword information 58, 59 and 60 is combined by the combining unit 50 of the receiving unit 6, which is shown in duplicate in FIG. 2 for the ease of understanding. It is to be noted, that the combining of codeword information 58, 59 and 60 succeeds the combining of codeword information 55, 46 and 47.

The result of the (later) combining is the combined codeword information 61.

The combined codeword 61 can be output from the receiving unit 6 to the decoding unit 8. However, as shown in FIG. 2, the combined codeword 51 is in best mode buffered in the receiving unit 6, and a further combining unit 62 performs combining of the combined codeword 61 and the combined codeword 51 buffered to output a combined codeword 63. The combined codeword 63 is then output to the decoding unit 8. It is possible to buffer the combined codeword 63, and, same as the combined codeword 51, use it for a further combining in the combining unit 62. The features of the combining unit 62 are similar to the combining unit 50, and the combining units 50, 62 can be constructed as a single element.

The combining unit 50 performs the intra-frame transport format combination indicator combining. The combining unit 62 performs the inter-frame transport format combination indicator combining.

Figure 3:
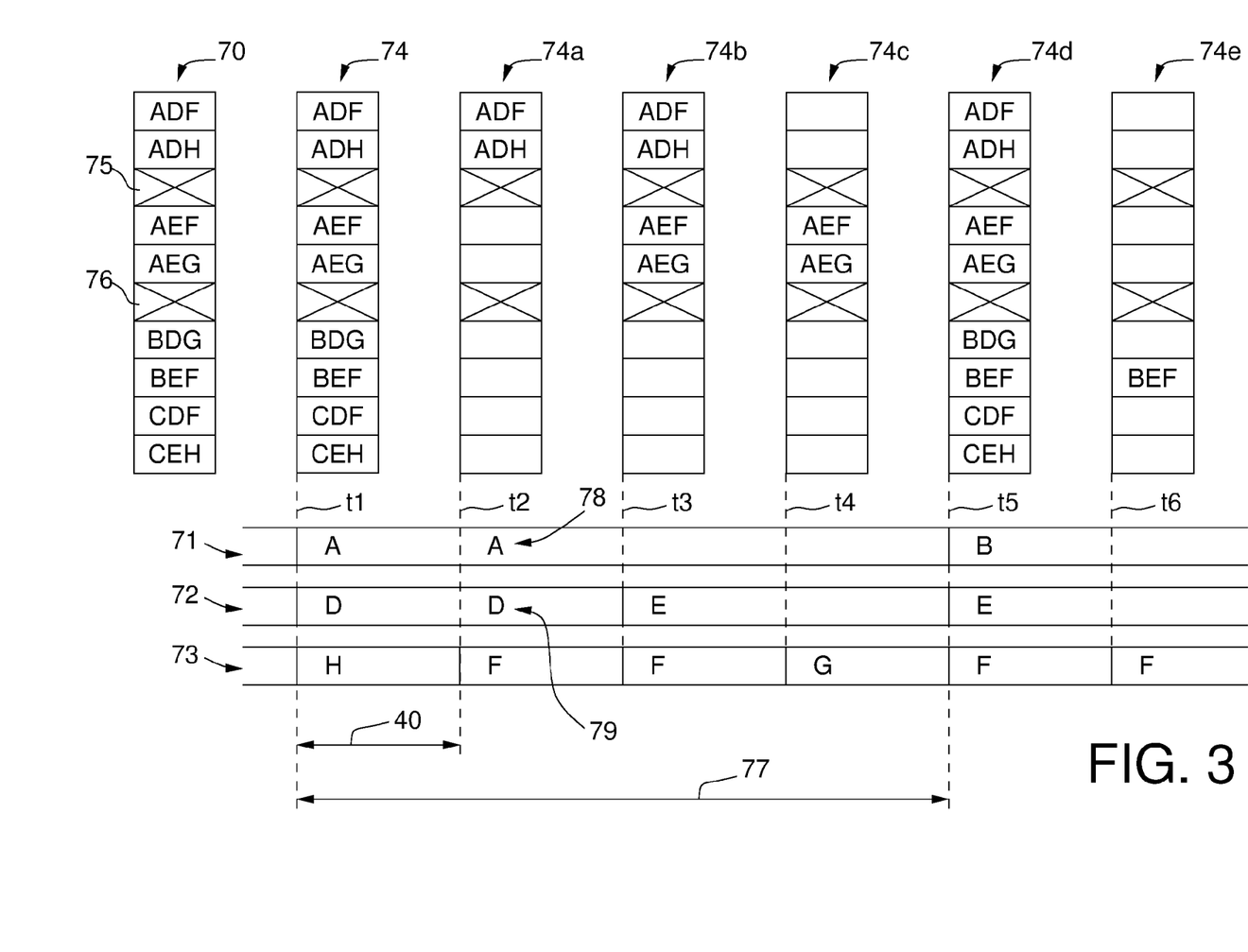
FIG. 3 illustrates the utilization of a codeword list in the preferred embodiment of the invention.

FIG. 3 shows the decoding method with the input list of allowed transport format combinations. On the left side of FIG. 3 a list 70 of available transport format combinations is shown. This list 70 is input from the software protocol layer over the line 27 to the memory unit 26 of FIG. 1. In the beginning of a new transmission time interval for each of the transport channels 71, 72, 73, for example at the timing t1, the list 74 of allowable transport format combinations is reset to the list 70 of available transport format combinations. Hence, at the timing t1 the allowed transport format combinations are ADF, ADH, AEF, AEG, BDG, BEF, CDF and CEH. The fields 75 and 76 are closed out, which indicate some non-available transport format combinations. The transport format combinations closed out are not configured by the transmitter, for example, the network, so that the corresponding transport format combination indicator codeword must not be transmitted.

At timing t1 the transport format combination ADH of the list 74 is determined so that the first channel 71 is processed with transport format A, the second channel 72 is processed with transport format D and the third channel 73 is processed with transport format H. In FIG. 3, the minimum transmission time interval 40 is the distance between the timing t1 and the timing t2. During the minimum transmission time interval several frames may be received, if the minimum transmission time interval is greater than 10 ms, but the transmitted transport format combination indicator will be the same in all those frames. At timing t2 the transmission time interval of the third channel 73 ends. Hence, it is possible that the transport format of the third channel 73 changes. But, the transmission time interval of the first channel 71 passes over from the latest frame to the next frame so that the transport format is the same as before. The transport format for the second channel 72 at timing t2 is the same as that at timing t1, accordingly. Therefore, the list 74 of allowed transport format combinations is reduced to the list 74a on the basis of the first codeword decision indicating a transport format combination of ADH. Only for the first channel 71 and the second channel 72 the transport format must be maintained so that all combinations beginning with AD are allowed. Therefore, the list 74a comprises only two elements: ADF and ADH.

A timing t3, again, the timing of the third channel 73 ends, and now the transmission time interval of the second channel 72 ends, too. Hence, it is possible that both the transport format of the second channel 72 and the transport format of the third channel 73 are changed. Therefore, the list 74b of allowed transport format combinations at timing t3 can only be reduced in view of the transport format A of the first channel 71. That means, that the allowed codewords are reduced only by the first letter A. Hence, at timing t3 the list 74b of allowed transport format combinations is: ADF, ADH, AEF, AEG. It is to be noted, that the list 74b of allowed transport format combinations comprises more elements of allowable transport format combinations than the list 74a.

At timing t3 the transport format of the third channel 73 is maintained, but the transport format of the second channel 72 is changed from D to E.

At timing t4 the transmission time interval of the third channel 73 ends and the transmission time interval of the second channel 72 carries on. Also, the transmission time interval of the first channel 71 is carried on since timing t1. The list reduction at timing t4 is therefore based on both the transport format A of the first transport channel 71 and the transport format E of the second transport channel 72. The list reduction based on these two transport formats results in the allowable transport format combinations: AEF and AEG. Hence, at timing t4 the list 74c of allowable transport format combinations comprises these two elements. At timing t5 the transmission time intervals of all transport channels 71, 72 and 73 end so that the list 74d of allowed transport format combinations is reset to the list 70 of available transport format combinations. The software protocol layer has, in this case, not changed the list 70 of available transport format combinations so that the list 74d is the same as the list 74. At this timing t5 it is possible that for each of the transport channels 71, 72, 73 the respective transport format is changed.

At timing t5 a transport format combination BEF is determined. At timing t6 the transmission time interval of the third channel 73 ends. Hence, usually it is now possible that the transport format of the third channel 73 is changed. But in this case, the transport format F of the third channel 73 must be maintained, as described in the following.

The transport format B of the first channel 71 and the transport format E of the second channel 72 are maintained, because the respective transmission time interval passes over from the latest frame to the next frame. Hence, the list 74e of available transport format combinations is reduced on the transport formats B at the first place and E at the second place. But, based on the list of available transport format combinations 70, a BE combination is only available once. Therefore, the list 74e of allowed transport format combinations comprises, in this special case, only one element: BEF. Therefore, if the decision BEF at timing t5 is correct, the transport format for the third channel 73 at timing t6 must also be F. The transport format for the third channel 73 at timing t6 is then selected as F.

The above described transport format combination indicator decoding method is greatly dependent on the correctness of the very first transport format combination indicator decision at timing t1 for the maximum transmission time interval 77. This decision is always the most error-prone of all, because it is performed on the full list 70 of available transport format combinations. If the decision is correct, the following transport format combination indicator error performance will be very good, but if it is not correct, transport format combination indicator error propagation will occur, which may affect all transport format combination indicator decisions within the maximum transmission time interval 77. A measure of reliability in transport format combination indicator decision is obtained from the difference of correlation results in the output list stored in the memory unit 12 of the decoding apparatus 1. This quantity can be judged against some normalized threshold to tell good from bad. The decoding method, especially for long maximum transmission time intervals 77 and low transmission frame combination indicator decision reliability, trades some transmission frame combination indicator decision optimality against reduced probability of error propagation, as described below.

In case that the transport format combination indicator decision was found to be unreliable at timing t1, the transport format combination indicator decision at timing t2 is not performed with the list 74a, but with list 74 again. In case that the unreliable decision from timing t1 is confirmed at timing t2, as indicated by the letter 78 and the letter 79, the transport format combination ADF is regarded as an approved codeword for a transport format combination. At timing t1 the codeword decision unit 15 has not sent a codeword to the list reduction unit 9. But, at timing t2 the codeword decision unit 15 sends a codeword indicating a transport format combination ADF to the list reduction unit 9. Hence, at timing t3, a list reduction is performed so that the list 74b of allowable codewords is achieved, as described above.

If the decision at timing t1 contradicts the decision at timing t2, it is unclear, whether the first, the second, or both codeword decisions are in error. For this reason, the two respective output lists stored in the memory unit 12 will be analyzed to come up with an improved common decision by taking into account the respective correlation results of the top (most reliable) codeword candidates. Based on this consolidated decision, the decision from timing t1 is revised and corrective measures to the payload reception are taken and/or the original decision at timing t2 is rejected and replaced by the consolidated decision.

For example, assume that the decision at timing t1 was the wrong BEF and found to be quite unreliable. The decoding at timing t2 results in the correct and reliable decision ADF. The second decision can be used to help to recover the decoding for the first transport channel 71 and eventually also for the second transport channel 72, by marking any already processed first blocks (between timing t1 and timing t2) as an erasure. The processing for the third transport channel 73 based on the incorrect transport format combination indicator is not recovered to optimize for speed. Therefore, the frame buffer 31 can be overwritten by the next frame. Only to show the potential of exploiting transport format combination indicator dependencies, it is to be noted, that with huge buffers and no real-time constraints, even a revision of the third transport channel 73 is feasible by using the reliable transport format combination indicator information from timing t2 to redo transport format combination indicator decoding for timing t1 with a reduced input list.

It is clear that a large number of variants can be devised on how to exploit transport format combination indicator dependencies for better decoding performance and on how to consolidate the decoder output lists.

Figure 4:
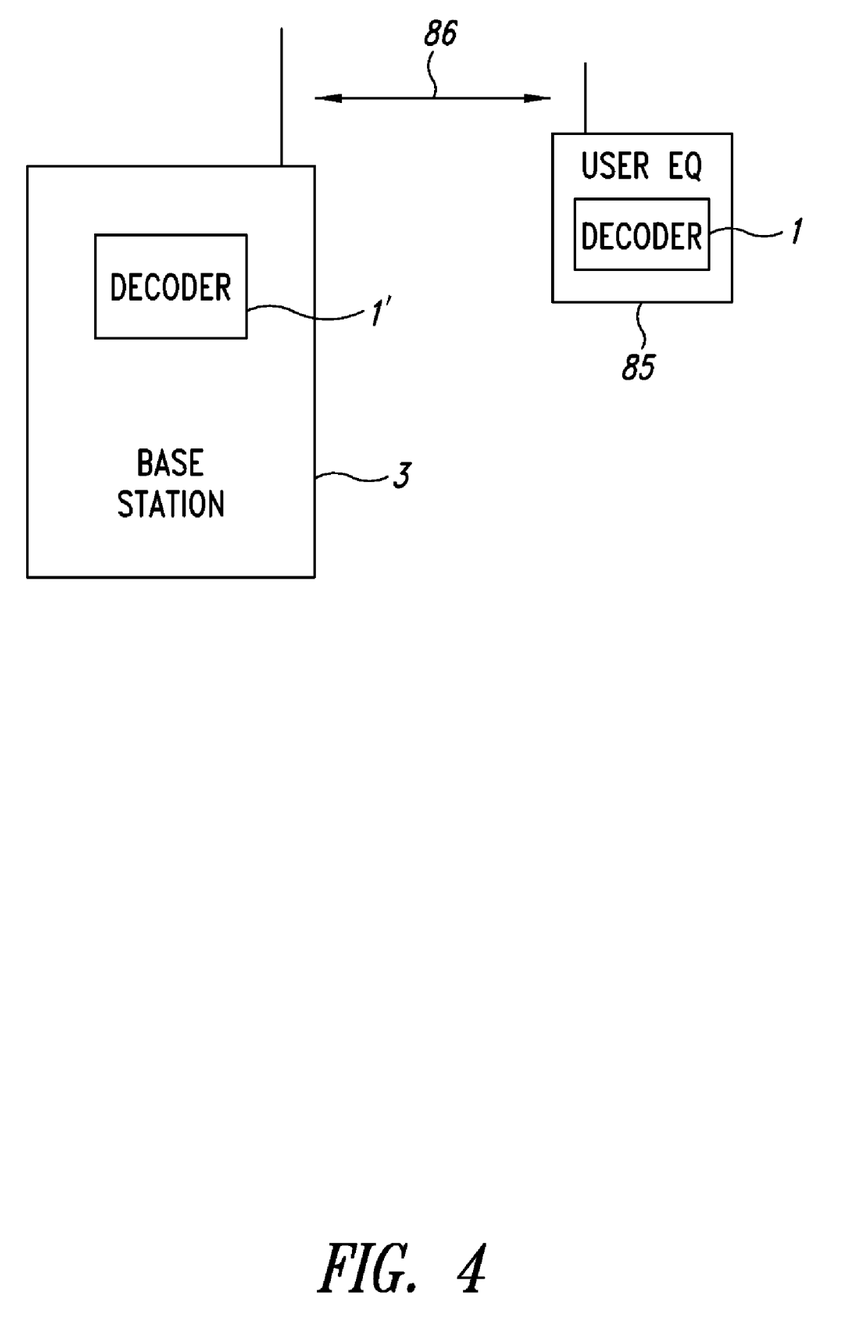
FIG. 4 shows a receiver unit and a base station according to the preferred embodiment of the invention, each comprising a decoding apparatus as shown in FIG. 1.

FIG. 4 shows a base station 3 and a user equipment 85 according to the preferred embodiment of the invention. The user equipment 85 is linked to the base station 3 by a radio link 86 of a cellular mobile communication system. The user equipment 85 comprises the decoding apparatus 1 for decoding a codeword information for a transport format combination indicator for downlink connections. The base station 3 comprises a decoding apparatus 1'. The decoding apparatus 1' of the base station 3 is used for decoding a codeword information for a transport format combination indicator for uplink connections.

The described decoding apparatus 1 and decoding method have the following advantages. There are no large data buffers required and a strictly in time processing of payload data based on the most recent transport format combination indicator codeword decision is provided. Further, there is an option to declare erasures on payload data in case of wrong processing due to a wrong transport format combination indicator codeword decision.

To enhance the performance, a successive reduction of the transport format combination indicator codeword list 74 during a maximum transmission time interval period 77 is possible. Thereby, the list 74 of allowed transport format combinations is derived from the list 70 of available transport format combinations based on the per-transport channel continuity of transport format combination indicator decisions within the transmission time interval. Hence, the probability of error for the later decodings is reduced due to the reduced number of codewords.

An intra-frame and inter-frame combining of repeated transport format combination indicator codewords prior to the transport format combination indicator decoding is provided. Further the input list stored in the memory unit 12 can be accessed to provide optimum results.

In the following, by way of example, possible applications of the present invention are mentioned:

Intra-frame combining: This process combines all identical transport format combination indicator codewords received during the same frame to one soft-bit vector. This is fully applicable in Time-Division Duplex systems and for coded composite transport channels with small spreading factor in Wideband Code-Division Multiple Access.

Inter-frame combining: If the minimum transmission time interval of the composite coded transport channel is larger than 10 ms, this process will combine all frame-related soft-bit vectors to one minimum transmission time interval related soft-bit vector. This is applicable in all 3rd Generation partnership project systems.

Ideally, payload processing does not start until the most reliable transport format combination indicator result is available. If due to memory or real-time constraints, processing needs to start based on the premature transport format combination indicator decision from the first frame, the later decoding results can be used to check the initial transport format combination indicator decision. In case of contradiction, a transport format combination indicator decision revision is done and it is also possible to conceal wrongly process payload data bits for partial error recovery. Decision revision is enabled by appropriate processing of transport format combination indicator output lists belonging to contradicting transport format combination indicator decisions. This is applicable in all 3rd Generation partnership project systems.

The described optimum transport format combination indicator decoding is applicable, but not limited, to Wideband Code-Division Multiple Access and Time-Division Duplexing high/low chip rate within the UMTS standards family. The low chip rate version of Time-Division Duplexing is also dubbed Time-Division Synchronous Code-Division Multiple Access.

In the following, by way of an example, but not limiting the present invention, results of a practical simulation for an additive white Gaussian Noise channel are described. Simulation results have been achieved for transport format combination indicator codeword length from 1 to 7. There have been three groups of results, which correspond to three different transport format combination indicator encoding schemes used in Time-Division Duplex Systems to transport format combination indicator information of different length. It is to be noted, that for Frequency-Division Duplex Systems only one group was used for all transport format combination indicator length. The error rate in each group improves with reducing the number of transport format combination indicator bits, which clearly shows the gain obtained with thinning out the number of available transport format combination indicators to a list of allowed transport format combination indicators. Due to the widely biorthogonal property of the transport format combination indicator codes, the error rate is halved by halving the number of codewords. For a signal to noise ratio having 0 dB a reduction of the transport format combination indicator codeword error rate up to a factor of $10^3$ can be achieved. For a signal to noise ratio having 3 dB a reduction of $2.5 \times 10^2$ to $2 \times 10^5$ can be achieved. For a signal to noise ratio having 6 dB the reduction of the error rate is at least $3 \times 10^3$.

Although an exemplary embodiment of the invention has been disclosed, it will be apparent to those skilled in the art that various changes and modifications can be made which will achieve some of the advantages of the invention without departing from the spirit and scope of the invention, such modifications to the inventive concept are intended to be covered by the appended claims in which the reference signs shall not be construed as limiting the scope of the invention. Further, in the description and the appended claims the meaning of "comprising" is not to be understood as excluding other elements or steps. Further, "a" or "an" does not exclude a plurality, and a single processor or other unit may fulfill the functions of several means recited in the claims.

The invention claimed is:

1. A decoder, comprising:
a codeword receiving unit configured to:
receive a first codeword information and at least second codeword information;
send the first codeword information; and
subsequently send the second codeword information;
a codeword decision unit configured to:
receive the first codeword information and subsequently receive the at least second codeword information sent by the codeword receiving unit;
decide and output a first codeword decision on the basis of said first codeword information received from said codeword receiving unit; and
decide and output a second codeword decision on the basis of said at least second codeword information and said preceding first codeword information;
a memory configured to store a list of allowable codewords; and
a list reduction unit configured to reduce the list of allowable codewords, wherein when a new transmission time interval begins, the list of allowable codewords is reset to a list of available codewords and the list reduction unit is configured to reduce the list of allowable codewords for a next codeword decision on a basis of a previous codeword information, wherein the list of allowable codewords is reduced on the basis of a latest codeword decision, and wherein codewords of the list of allowable codewords for which a transmission frame indicator of a respective transmission channel is not equal to a transmission frame indicator given by the latest codeword decision are temporarily canceled if a transmission time interval of that transmission channel passes over from a latest frame to a next frame.

2. The decoding apparatus according to claim 1 wherein said codeword receiving unit is configured to receive at least a third codeword information and to send said third codeword information to said codeword decision unit subsequent to said first codeword information and in advance to said second codeword information, and said codeword decision unit is configured to determine whether a possible third codeword decision based on said third codeword information confirms said first codeword decision.

3. The decoding apparatus according to claim 2 wherein said codeword decision unit, in case that said possible third codeword decision confirms said first codeword decision, is configured to output the codeword decision on the basis of said third codeword information as an approved codeword decision, and, in case that said possible third codeword decision does not confirm said first codeword decision, is configured to output a third codeword decision on the basis of said first codeword information and said second codeword information as a common codeword decision.

4. The decoding apparatus according to claim 3 wherein said codeword decision unit, in case that said possible third codeword decision does not confirm said first codeword decision, is configured to output said third codeword decision on the basis of reliability information of possible first codeword decisions based on said first codeword information and correlation results of possible third codeword decisions based on said third codeword information.

5. The decoding apparatus according to claim 3 wherein said codeword decision unit is configured to determine on the basis of said third codeword decision, whether said first codeword information was erroneous or not, and said decoding apparatus in case that said first codeword information was erroneous, is configured to erase payload data already processed on the basis of said first codeword decision based on said erroneous first codeword information.

6. The decoding apparatus according to claim 2 wherein said codeword receiving unit is configured to combine codeword information received during a frame by adding said codeword information received.

7. The decoding apparatus according to claim 2 wherein said codeword receiving unit is configured to combine codeword information received during at least two frames within a transmission time interval, in which the transmission time intervals of all transmission channels pass over from the latest frame to the next frame, by adding said codeword information received.

8. The decoding apparatus according to claim 2 wherein said codeword receiving unit is configured to receive said third codeword information subsequent to said first codeword information and in advance to said second codeword information.

9. The decoding apparatus according to claim 1 wherein said codeword receiving unit is configured to receive said second codeword information subsequent to said first codeword information.

10. A receiver, comprising:
an input; and
a decoder, the decoder including:
  a receiving unit coupled to the input and configured to:
    receive a first codeword information and at least second codeword information;
    send the first codeword information; and
    subsequently send the second codeword information;
  a codeword decision unit configured to:
    receive the first codeword information and subsequently receive the at least second codeword information sent by the receiving unit;
    decide and output a first codeword decision on the basis of said first codeword information received from said receiving unit; and
    decide and output a second codeword decision on the basis of said at least second codeword information and said preceding first codeword information;
  a memory configured to store a list of allowable codewords; and
  a list reduction unit configured to reduce the list of allowable codewords, wherein when a new transmission time interval begins, the list of allowable codewords is reset to a list of available codewords and the list reduction unit is configured to reduce the list of allowable codewords for a next codeword decision on information, wherein the list of allowable codewords is reduced on the basis of a latest codeword decision, and wherein codewords of the list of allowable codewords for which a transmission frame indicator of a respective transmission channel is not equal to a transmission frame indicator given by the latest codeword decision are temporarily canceled if a transmission time interval of that transmission channel passes over from a latest frame to a next frame.

11. The receiver according to claim 10 wherein the receiver unit is a user equipment of a cellular communication network.

12. The receiver according to claim 10 wherein the receiver unit is a base station of a cellular communication network.

13. A method, comprising:
receiving a first codeword information;
deciding a first codeword decision on the basis of said first codeword information;
receiving a second codeword information subsequent to said first codeword information;
deciding a second codeword decision on the basis of said second codeword information and at least said first codeword information;
storing a list of allowable codewords, which is reset to a list of available codewords when a new transmission time interval begins; and
reducing the list of allowable codewords for a next decision codeword based on at least one previous codeword information, wherein the list of allowable codewords is reduced based on a latest codeword decision, and wherein codewords of the list of allowable codewords for which a transmission frame indicator of a respective transmission channel is not equal to a transmission frame indicator given by the latest codeword decision are temporarily canceled if a transmission time interval of that transmission channel passes over from a latest frame to a next frame.

14. The method of claim 13, further comprising:
receiving at least a third codeword information subsequent to said first codeword information and in advance to said second codeword information; and
determining whether a possible third codeword decision based on said third codeword information confirms said first codeword decision.

15. The method of claim 14, further comprising:
when the possible third codeword decision confirms the first codeword decision, outputting a codeword decision on the basis of said third codeword information as an approved codeword decision; and
when the possible third codeword decision does not confirm said first codeword decision, outputting a third codeword decision on the basis of said first codeword information and said second codeword information as a common codeword decision.

16. The method of claim 14, further comprising:
when the possible third codeword decision does not confirm the first codeword decision, outputting a third codeword decision on the basis of reliability information of possible first codeword decisions based on said first codeword information and correlation results of possible third codeword decisions based on said third codeword information.

17. The method of claim 14, further comprising:
determining on the basis of said possible third codeword decision, whether said first codeword information was erroneous; and
when it is determined the first codeword information was erroneous, erasing payload data processed on the basis of the first codeword decision.

18. The method of claim 13, further comprising:
generating the list of available codewords based on information provided by a protocol software layer.

19. The decoding apparatus of claim 1 wherein the list of available codewords is based on information provided by a protocol software layer.

20. The receiver of claim 10 wherein the list of available codewords is based on information provided by a protocol software layer.

21. A non-transitory computer readable medium containing contents which cause a decoder to perform a method, the method comprising:
receiving a first codeword information;
deciding a first codeword decision on the basis of said first codeword information;
receiving a second codeword information subsequent to said first codeword information;
deciding a second codeword decision on the basis of said second codeword information and at least said first codeword information;
storing a list of allowable codewords, which is reset to a list of available codewords when a new transmission time interval begins; and
reducing the list of allowable codewords for a next decision codeword based on at least one previous codeword information, wherein the list of allowable codewords is reduced based on a latest codeword decision, and wherein codewords of the list of allowable codewords for which a transmission frame indicator of a respective transmission channel is not equal to a transmission frame indicator given by the latest codeword decision are temporarily canceled if a transmission time interval of that transmission channel passes over from a latest frame to a next frame.

22. The non-transitory computer readable medium of claim 21 wherein the method further comprises:
generating the list of available codewords based on information provided by a protocol software layer.

23. A system, comprising:
means for receiving first and second codeword information;
means for deciding a first codeword decision on the basis of said first codeword information and for deciding a second codeword decision on the basis of said second codeword information and at least said first codeword information;
means for storing a list of allowable codewords;
means for resetting the list of allowable codewords to a list of available codewords when a new transmission time interval begins; and
means for reducing the list of allowable codewords for a based on at least one previous codeword information, wherein the list of allowable codewords is reduced based on a latest codeword decision, and wherein codewords of the list of allowable codewords for which a transmission frame indicator of a respective transmission channel is not equal to a transmission frame indicator given by the latest codeword decision are temporarily canceled if a transmission time interval of that transmission channel passes over from a latest frame to a next frame.

24. The system of claim 23, further comprising:
means for generating the list of available codewords based on information provided by a protocol software layer.

25. The system of claim 23 wherein the means for receiving is configured to receive at least a third codeword information subsequent to said first codeword information and in advance to said second codeword information, further comprising:
means for determining whether a possible third codeword decision based on said third codeword information confirms said first codeword decision.

* * * * *

UNITED STATES PATENT AND TRADEMARK OFFICE
CERTIFICATE OF CORRECTION

| | | |
|---|---|---|
| PATENT NO. | : 7,957,492 B2 | Page 1 of 1 |
| APPLICATION NO. | : 11/720316 | |
| DATED | : June 7, 2011 | |
| INVENTOR(S) | : Stefan Mueller-Weinfurtner et al. | |

It is certified that error appears in the above-identified patent and that said Letters Patent is hereby corrected as shown below:

Title Page, Item 73
"ST-Ericsson SA, Plan-les-Ouates" should read --ST-Ericsson SA, Plan-les-Ouates (CH)--.

Column 14
Claim 10, Line 15, "information, wherein the list of allowable codewords" should read
--a basis of a previous codeword information, wherein the list of allowable codewords--.

Column 16
Claim 23, Line 24, "based on at least one previous codeword information" should read
--next decision codeword based on at least one previous codeword information--.

Signed and Sealed this
Twenty-sixth Day of July, 2011

David J. Kappos
*Director of the United States Patent and Trademark Office*